Figure 1:
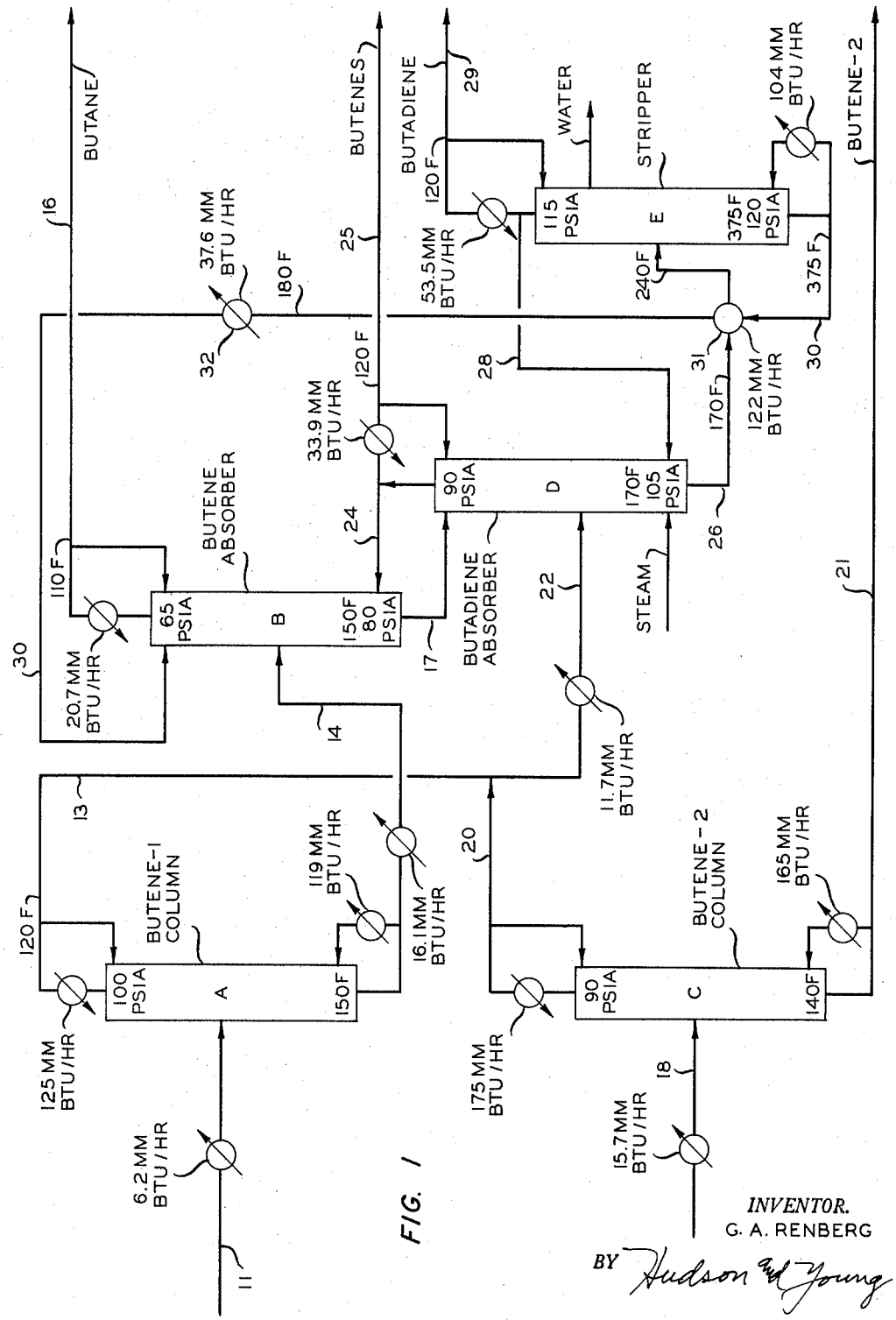

Feb. 1, 1966     G. A. RENBERG     3,232,849
BUTENE AND BUTADIENE PURIFICATION
BY PLURAL STAGE DISTILLATION
Filed Oct. 27, 1961     2 Sheets-Sheet 2

INVENTOR.
G. A. RENBERG
BY Hudson and Young
ATTORNEYS

United States Patent Office

3,232,849
Patented Feb. 1, 1966

3,232,849
BUTENE AND BUTADIENE PURIFICATION BY
PLURAL STAGE DISTILLATION
Graham A. Renberg, Bartlesville, Okla., assignor to Phillips Petroleum Company, a corporation of Delaware
Filed Oct. 27, 1961, Ser. No. 148,188
8 Claims. (Cl. 203—51)

This invention relates to a method and apparatus for the separation and recovery of butadiene and of butenes from products resulting from the catalytic dehydrogenation of butenes and of n-butane, respectively, by a combination of fractional and extractive distillation steps.

In a commercial process for the manufacture of butadiene, including the following steps: (1) butane dehydrogenation to butenes, (2) butenes recovery or purification, (3) butenes dehydrogenation to butadiene, and (4) butadiene recovery or purification, the use of furfural as a selective solvent in the extractive distillation of butenes and butadiene has made the process practical and economical. The use of furfural permits separations of $C_4$ hydrocarbons which were heretofore considered impossible or impractical on a commercial scale. It was this type of separation upon which the production of the high purity butadiene depended. Furfural absorbers were used to separate normal butane from unsaturated $C_4$ hydrocarbons (step 2) and also for separating butadiene from butenes in the butadiene purification or recovery step (step 4). These absorber columns are of conventional bubble cap type and in the preferred modification are constructed in a pair of 50-tray sections. The function of the absorbers is to separate the product of that step from the recycle material (to the preceding step) while the remainder of the columns (fractionator) function on the whole as auxiliary columns to increase absorber feed purity or to process by-product streams. Since butenes in the normal butane recycle to the step (1) dehydrogenation and butadiene in the butenes recycle to step (3) dehydrogenation are partially destroyed over the catalysts, substantial losses are suffered when upset or inferior operation of the absorbers occurs leaving larger than normal amounts of butenes and butadiene in the recycle streams. In addition, normal butane in the kettle product takes a "free ride" through the butene dehydrogenation step acting as a diluent. Also, butenes in the kettle product of step (4) absorbers unnecessarily overload the butadiene purification column downstream of the absorber.

Prior art ordinarily employs indirect heat exchange with steam or with a hot plant product to provide reboiling heat to fractional distillation columns. To improve stripping in such operations, open steam is frequently employed where water resulting from steam condensation is not objectionable.

The terms "extractive distillation towers, columns or absorber" are used interchangeably herein.

An object of this invention is to provide a method and apparatus for the recovery of butenes and of butadiene from separate process streams containing these materials. It is a further object of this invention to provide an improved process and apparatus for the recovery of butadienes and of butenes involving extractive distillations. It is a further object of this invention to provide apparatus in such a process in which substantial energy savings are effected over conventional operations for the recovery of these materials.

In the drawing, FIGURE 1 illustrates, in diagrammatic form, an arrangement of apparatus parts for carrying out an embodiment of this invention.

Figure 2:
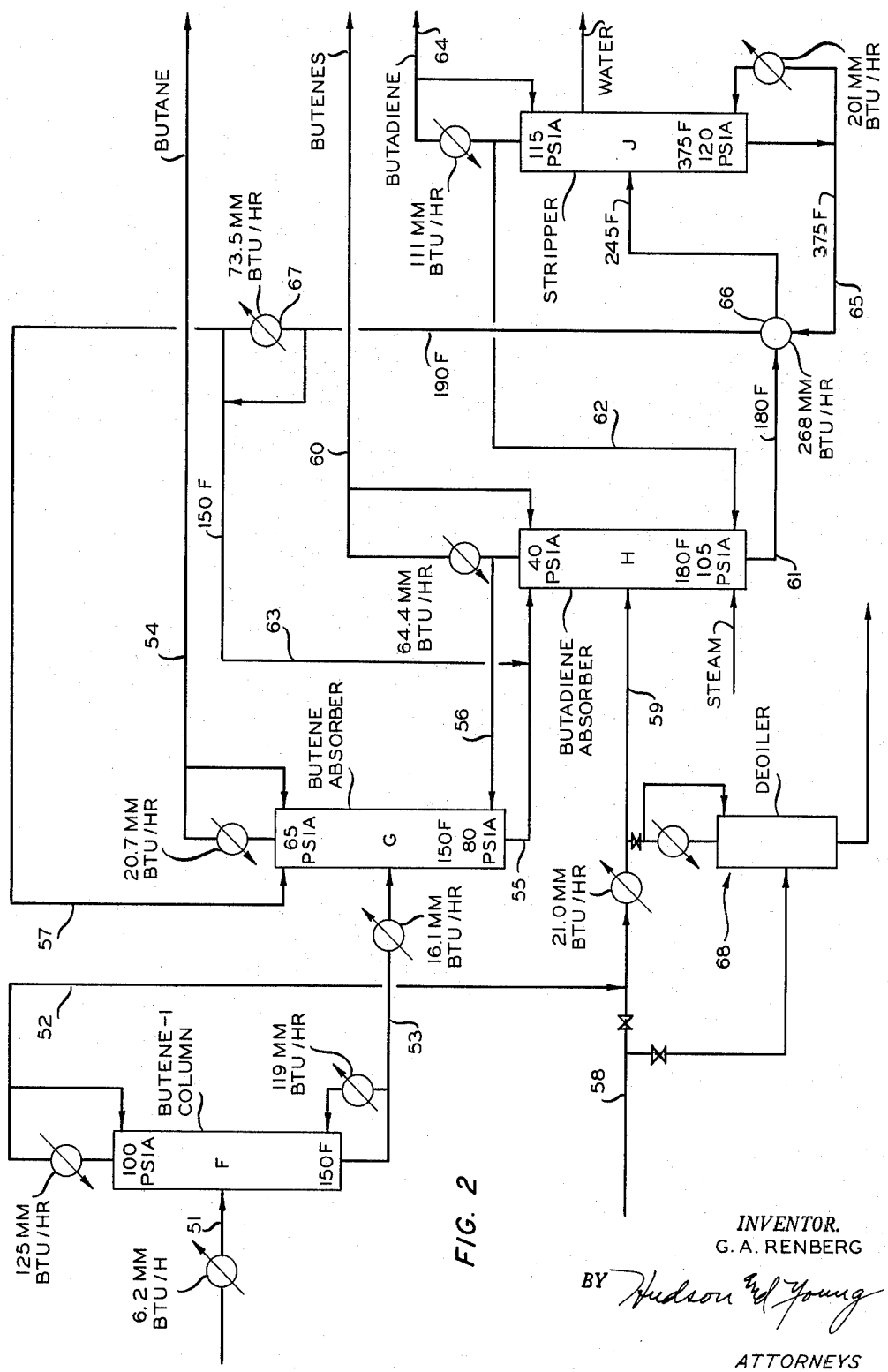

FIGURE 2 illustrates, in diagrammatic form, another arrangement of apparatus parts for carrying out an alternative process embodiment of this invention.

The method of manufacturing butadiene by the two-stage dehydrogenation of butane is well known. One of the major costs of this method for the production of butadiene is in the energy requirements demanded by the purification steps. These process steps involve essentially a series of fractionation and extractive distillation steps.

In one typical process the purification train comprises essentially two fractional distillation columns and two extractive distillation columns. The first of the fractional distillation columns serves primarily to separate butene-1 from butene-2 produced in the dehydrogenation of normal butane. The distillation column effecting this separation is herein termed the butene-1 column. The bottoms from the butene-1 column comprising essentially n-butane (normal butane) and butene-2 is passed to a butene absorber which absorbs the major portion of the butenes therefrom. Normal butane is rejected as an overhead stream and is recycled to the original dehydrogenation step. This normal butane reject stream is produced as an overhead stream from the butene absorber (butene extractive distillation column). Overhead vapors from the butene-1 fractionator comprising essentially butene-1 and the small amount of butadiene are combined with overhead vapors from a butene-2 column, said overhead vapors from said butene-2 column comprising essentially butene-1 and butadiene. The butene-1 column distills the n-butane dehydrogenation effluent as feed stock and passes butene-1 overhead from the column while the butene-2 column distills the butenes dehydrogenation effluent and separates material lower boiling than butene-2 as overhead and concentrates the butene-2 in the kettle product. The feed to the butene-2 column is a deoiled and depropanized stream comprising essentially butadiene and normal butenes produced in the second stage dehydrogenation. The combined overhead vapors from the butene-1 column and from the butene-2 column are then passed to a butadiene absorber or extractive distillation column in which butadiene is absorbed in a selective solvent.

I have now found that purification energy requirements can be substantially reduced by using rich solvent or absorbent from the butene absorber, without stripping, as a solvent feed to the butadiene absorber. I have also found that a portion of the overhead vapors from the butadiene absorber can be effectively used as reboil or boil-up material in the butene absorber with the result that energy requirements in the butene absorber are markedly reduced. The butadiene rich absorbent from the kettle section of the butadiene absorber is stripped of its butadiene content in a stripping column. I have also found that a portion of the vapors produced in this stripping column can be used to reboil or boil-up the kettle section of the butadiene absorber with the result that further saving in heat requirements is obtained.

Use of boil-up vapors from subsequent columns for reboiling extractive distillation columns upstream from the respective columns producing the overhead vapors eliminates the need for the provision of conventional reboilers in the extractive distillation columns.

Furthermore, in addition to the above-mentioned energy savings, I have also found that one of the fractionators in the recovery system can be eliminated in some instances.

Referring to the drawing and specifically to FIGURE 1, reference numeral 11 identifies a conduit which passes the hydrocarbon stream produced in dehydrogenation of normal butane, which stream has been deoiled for the removal of high-boiling constituents therefrom, into a fractional distillation column A. Reference numeral 13 identifies a conduit through which a hydrocarbon stream produced in the catalytic dehydrogenation of butenes and having been freed from propane and lower boiling materials is passed to a fractional distillation column C. A conduit 13 passes overhead product from column A into a conduit 22 into which is also passed an overhead product from column C by way of a conduit 20. These combined streams are passed on through a conduit 22 into an extractive distillation column or absorber D. The distillation bottoms from column A is passed through a conduit 14 into a column B herein called the butene absorber. A solvent, such as furfural, is passed through a conduit 30 into the upper portion of column B. Reboil or boil-up vapors are introduced into this column through a conduit 24 and extraction solvent, rich in dissolved material, is passed through a bottoms outlet conduit 17 for passage as the selective solvent into the upper portion of the butadiene absorber D. Overhead product from col- Also shown in FIGURE 1 of the drawing are considerable operating data, such as pressures, temperatures, and many heat quantities in terms of B.t.u. per hour. By using the hot stripper bottoms at about 375° F. for preheating the feed to this stripper considerable heat is also saved. Heat exchanger 31 heats the charge to the stripper E from about 170° F. to about 240° F. with the simultaneous cooling of the lean furfural from about 375° F. to about 180° F. Further cooling of this partially cooled lean furfural is carried out in heat exchanger 32 with the result that the lean furfural is finally cooled to a temperature of about 117° F. Overhead material downstream of the reflux condenser of column C has a temperature of about 120° F.

In Table I is given a material balance in terms of moles per hour of various constituents in various process conduits. In both embodiments, i.e., FIGURES 1 and 2, furfural is employed as the extraction solvent.

TABLE I

| Material balance, mols/hr. | 11 | 13 | 14 | 16 | 17 | 24 | 18 | 20 | 22 | 21 | 26 | 28 | 25 | 29 | 30 |
|---|---|---|---|---|---|---|---|---|---|---|---|---|---|---|---|
| Butene-1 | 256 | 253 | 3 | 3 | 1,626 | 1,626 | 612 | 607 | 860 | 5 | 33 | 33 | 858 | 2 | |
| Butadiene | 83 | 83 | | | 20 | 20 | 412 | 407 | 409 | 5 | 5,640 | 5,160 | 10 | 480 | |
| n-Butane | 1,533 | 9 | 1,524 | 1,513 | 53 | 42 | 10 | 2 | 11 | 8 | | | 22 | | |
| t-Butene-2 | 262 | 1 | 261 | 14 | 727 | 480 | 545 | 19 | 20 | | 526 | 164 | 150 | 253 | 14 | |
| c-Butene-2 | 262 | | 262 | | 757 | 495 | 545 | 1 | 1 | | 544 | 11 | 10 | 262 | 1 | |
| *Furfural | | | | | 16,800 | | | | | | 16,800 | | | | 16,800 |
| Total | 2,396 | 346 | 2,050 | 1,530 | 19,983 | 2,663 | 2,124 | 1,036 | 1,382 | 1,088 | 22,648 | 5,353 | 1,405 | 497 | 16,800 | umn B is withdrawn therefrom and is passed through a conduit 16 for return to the original normal butane dehydrogenation step, not shown. Obviously, butene absorber B is operated under suitable extractive distillation conditions for the absorption of butene from the feed to the column with the rejection of the normal butane for recycle purposes. The butene-rich solvent as mentioned is passed through conduit 17 to the upper portion of the butadiene absorber. The butene-rich stream flowing through conduit 17 contains a very small proportion of butadiene. The stream flowing through conduit 22 contains an appreciable portion of butadiene and this material is considered the feed stock to the extractive distillation column D. Upon operating this column under extractive distillation conditions an overhead vaporous product is produced containing butenes with a portion thereof being passed through a conduit 24 for boil-up purposes in the butene absorber. Excess overhead material from column D is condensed and a portion of the condensate is returned to the column as reflux while the remainder is passed through a conduit 25 for passage to the second stage dehydrogenation, not shown, for the conversion of butenes to butadiene.

The bottoms material or solvent rich in butadiene is withdrawn from column D through a conduit 26 containing a heat exchanger 31 and thence is passed into a stripping column E. In this stripping column, butadiene is stripped from the solvent and passed overhead from the column as hot vapors with a portion being passed through a conduit 28 into the lower portion of the butadiene absorber D for boil-up purposes. The remainder of the overhead material from column E, not required for refluxing, is withdrawn through a conduit 29 and passed to subsequent purification steps, not shown.

The bottoms material from stripper E is the lean absorbent and this material is passed through a conduit 30 through heat exchanger 31 and thence through additional heat exchange, if required, for introduction into the upper portion of the butene absorber B.

It should be pointed out that neither the butene absorber B nor the butadiene absorber D is provided with a reboiler system such as is ordinarily employed as ample reboiling and stripping are provided by use of the hot vapors generated in the process.

In FIGURE 2 of the drawing is the embodiment of the invention in which the butene-2 column corresponding to column C of FIGURE 1 is not required.

In FIGURE 2, conduit 51 transfers first stage dehydrogenation effluent, which has been deoiled, to a butene-1 distillation column F. In this column butene-1 containing a very small proportion of butadiene is taken overhead and passed through a conduit 52 to a subsequent step. Bottoms or kettle material from column F substantially freed of butene-1 and butadiene is passed through a conduit 53 as feed material to a butene absorber G. To this absorber is added lean solvent by way of a conduit 57 from the source, subsequently described. Hot boil-up vapors are also added through a conduit 56 while the solvent rich in butenes and containing a very minor portion of butadiene is passed through a conduit 55 for use as solvent in a butadiene absorber H. Overhead product normal butane is withdrawn from column G and passed to the first stage normal butane dehydrogenation through a conduit 54.

Depropanized bottoms material resulting from the second stage dehydrogenation of butenes is passed through a conduit 58 and this stream is combined with the overhead material from still F flowing through conduit 52. This combined stream passes on through a conduit 59 and is introduced into the butadiene absorber H as the feed stock thereto. This column is operated under butadiene extractive distillation conditions in which the butadiene is absorbed by the butene rich solvent introduced through conduit 55. Hot overhead vapor from column H is divided into two portions, one portion being passed through conduit 56 for boil-up purposes in the butene absorber G, while the remainder, after being at least partially condensed, is passed through a conduit 60 to the second stage or butene dehydrogenation step, not shown. The solvent, rich in butadiene, as bottoms from the butadiene absorber H is removed therefrom through a conduit 61 and this material is heated in exchanger 66 and then is introduced into a stripping still J for separation of butadiene. Hot butadiene-rich overhead vapors are divided into two portions, one portion being passed through a conduit 62 for boil-up purposes in the butadiene absorber H while the remainder is condensed and passed through a conduit 64 for subsequent purification or other disposal, not shown.

Lean solvent removed from the kettle section of still J is passed through a conduit 65, through the heat exchanger 66 and on through a conduit 57. From conduit 57 the solvent is added to the top of the butene absorber G. A portion of the solvent leaving heat exchanger 66 is cooled in an exchanger 67, if desired, and passed on through a conduit 63 for addition into the top of the butadiene absorber H. This additional solvent added to the top of butadiene absorber H is required in this embodiment because of the elimination of the conventional butene-2 distillation column.

The embodiment of FIGURE 2 employs a butene-rich overhead vaporous stream from absorber H for boil-up purposes in the butene absorber and a butadiene-rich overhead vaporous stream from the stripping still J for boil-up purposes in the butadiene absorber H. Also, the butadiene-rich solvent from the butene absorber is passed directly and without stripping as the solvent for use in the butadiene absorber H.

In FIGURE 2, the temperature of the overhead streams downstream of the reflux condensers of columns F, G, H, and J is about 120° F. in each case.

In this specification and claims the butenes-rich solvent flowing through conduit 55 is sometimes termed an extract phase. Also the butadiene-rich solvent flowing through conduit 61 is also sometimes called an extract phase. The corresponding streams flowing through conduits 17 and 26 in FIGURE 1 are also called extract phases.

In Table II is given a material balance of the components in the streams in process in the operation illustrated in FIGURE 2 in terms of moles per hour. As mentioned hereinabove, one of the main points or advantages of this invention is in the saving in cost of stripping steam by the use of the hot overhead vapors from several of the absorber and stripping columns.

In Table III is given process steam consumption at various process points in FIGURES 1 and 2 and also the saving in terms of dollar value based on fuel cost of 18 cents per million B.t.u.

Open steam lines leading into columns D (FIG. 1) and H (FIG. 2) introduce steam to the lower section of these columns and water is removed from columns E (FIG. 1) and J (FIG. 2) via the water lines in the upper sections of these columns.

TABLE III

*Steam consumption in several process points of FIGURES 1 and 2*

FURFURAL COLUMNS AND HYDROCARBON FRACTIONATORS

[Lb./hr. steam]

|  | Present operation | | Figure 1 | | Figure 2 | |
| --- | --- | --- | --- | --- | --- | --- |
|  | 30 p.s.i.g. | 300 p.s.i.g. | 30 p.s.i.g. | 300 p.s.i.g. | 30 p.s.i.g. | 300 p.s.i.g. |
| Absorbers B, G | 12,000 | 207,000 | 17,400 |  | 17,400 |  |
| Strippers |  | 50,400 |  |  |  |  |
| Absorbers D, H | 7,800 | 130,000 | 12,700 | 13,800 | 22,700 | 41,600 |
| Strippers E, J |  | 55,000 |  | 128,500 |  | 249,000 |
| B-1, Column A, F | 155,100 |  | 155,100 |  | 155,100 |  |
| B-2, Column C | 195,000 |  | 195,000 |  |  |  |
| Steam credit for furfural utilization | −167,000 |  |  |  |  |  |
| Additional steam to butadiene column |  |  |  |  | 34,500 |  |
| Total steam | 202,900 | 442,400 | 380,200 | 142,300 | 229,700 | 290,600 |
| Total, MM B.t.u./hr | 545 | | 467 | | 447 | |
| Fuel savings at 75% boiler efficiency—$/yr. (18¢ MM B.t.u.) | 0 | | $147,000 | | $185,000 | |

The first double column in Table III illustrates the pounds of steam per hour required at the pressure of 30 p.s.i.g. (pounds per square inch gage) and at 300 p.s.i.g. In the second and third double columns are given the steam requirements at the two above-mentioned pressures according to operation of FIGURE 1 and the operation of FIGURE 2. At a line immediately below the steam totals in these several columns are given to total B.t.u. requirements per hour in terms of millions of B.t.u. Thus, in the line immediately below the "present operation" double column is the number 545. This 545 means 545 million B.t.u. per hour. This steam saving in terms of millions of B.t.u. per hour was figured at 75 percent boiler efficiency and at a cost of 18¢ per million B.t.u. Thus, with the present operation as a basis, advantages or disadvantages are calculated according to the operations illustrated in FIGURE 1 and FIGURE 2. Thus, based on 75 percent boiler efficiency and at 18¢ per million B.t.u. the operation as practiced according to the process illustrated in FIGURE 1 provides a saving of $147,000 per year over a conventional process. And accordingly, the operation as practiced in the apparatus illustrated in FIGURE 2 provides an annual saving of 185,000 per year over the conventional process.

As a limited refinement to the operation as illustrated in FIGURE 2, if it is desired to de-oil the feed material flowing through conduit 58, a small distillation column assembly identified by reference numeral 68 can be employed. In this case, the proper valves are closed and others are opened for putting the still 68 on stream for

TABLE II

| Material balance, mols/hr. | 51 | 52 | 53 | 54 | 55 | 56 | 57 | 58 | 59 | 60 | 61 | 62 | 63 | 64 | 65 |
| --- | --- | --- | --- | --- | --- | --- | --- | --- | --- | --- | --- | --- | --- | --- | --- |
| Butene-1 | 256 | 253 | 3 | 3 | 1,089 | 1,089 |  | 612 | 865 | 863 | 39 | 37 |  | 2 |  |
| Butadiene | 83 | 83 |  |  | 6 | 6 |  | 412 | 495 | 21 | 8,754 | 8,280 |  | 474 |  |
| n-Butane | 1,533 | 9 | 1,524 | 1,513 | 38 | 27 |  | 10 | 19 | 30 |  |  |  |  |  |
| t-Butene-2 | 262 | 1 | 261 | 14 | 999 | 752 |  | 545 | 546 | 765 | 538 | 510 |  | 28 |  |
| c-Butene-2 | 262 |  | 262 |  | 1,051 | 789 |  | 545 | 545 | 805 | 38 | 36 |  | 2 |  |
| Furfural |  |  |  |  | 16,800 |  | 16,800 |  |  |  | 38,800 |  | 22,000 |  | 38,800 |
| Total | 2,396 | 346 | 2,050 | 1,530 | 19,983 | 2,663 | 16,800 | 2,124 | 2,470 | 2,484 | 48,169 | 8,863 | 22,000 | 506 | 38,800 | de-oiling the material flowing from conduit 58 prior to its addition to the material flowing from conduit 52 to conduit 59. In this case high boiling materials are removed from the charge material entering the butadiene absorber and such high boiling ends are thus not added to the solvent for cycling around the operation.

As mentioned hereinabove, furfural is generally used as a solvent for the extraction of butenes and for extraction of butadiene in both embodiments disclosed herein. In absorbers B and G the reflux ratios employed were 0.5 to 1, and in absorbers D and H the reflux ratios used were 0.65 to 1 under the temperature and pressure conditions given.

While furfural has been disclosed herein as the solvent used in columns, B, D and E of FIGURE 1 and in columns, G, H and J of FIGURE 2, furfural containing a small percentage of water is usually used in these columns.

The furfural to feed volume ratios in the butene absorbers B and G are 6 to 1. The furfural to feed volume ratio in the butadiene absorber H is 10 to 1.

While certain embodiments of the invention have been described for illustrative purposes, the invention obviously is not limited thereto.

I claim:

1. A method for the separation and recovery of butenes and butadiene from a feed stream comprising butene-1, butadiene and n-butane comprising extractively distilling said feed stream in the presence of an extractant comprising furfural, butene-1, n-butane, trans-butene-2 and cis-butene-2 thereby producing an overhead product comprising butene-1, n-butane, trans-butene-2 and cis-butene-2 as one product of the operation and a bottoms product comprising furfural and butadiene with minor proportions of butene-1 and butenes-2, distilling said bottoms product at a substantially higher temperature than that in the aforesaid distilling thereby producing a butadiene rich vaporous overhead product at said temperature, dividing this latter product into two portions, passing one portion into the extractive distillation operation as boil-up medium and removing the other portion as another product, this latter distilling step producing a bottoms product comprising furfural.

2. A method for separation and recovery of butadiene from a first and a second feed stock each feed stock comprising in different proportions butene-1, butadiene, n-butane, t-butene-2 and c-butene-2 comprising distilling said first feed stock thereby producing a first overhead product containing predominantly butene-1 and butadiene and a minor amount of n-butane and a first bottoms product containing predominantly n-butane, t-butene-2 and c-butene-2, extractively distilling said first bottoms product in the presence of furfural and thereby rejecting n-butane and producing a first extract comprising furfural and the above mentioned butenes, combining the second feed stock with said first overhead product and extractively distilling the combined materials in the presence of said first extract at a substantially higher temperature than that in the first mentioned distilling operation thereby producing an overhead stream comprising the above mentioned butenes and a second extract comprising furfural and butadiene, dividing this latter mentioned overhead stream into two portions, passing one portion into the first mentioned extractive distilling step as boil-up medium, distilling butadiene from said second extract at a substantially higher temperature than that in the second mentioned distilling operation thereby producing a bottoms product comprising furfural and an overhead butadiene stream, dividing this butadiene stream into two portions, adding one portion to the second extractive distilling operation as boil-up medium and removing the other portion as a product, and returning this latter furfural bottoms product to the first mentioned extractive distillation step as extractant.

3. A method for the separation and recovery of butadiene from a first feed stream comprising butene-1, butadiene and n-butane and produced in the dehydrogenation of n-butane and a second feed stream comprising butene-1, butadiene, trans-butene-2 and cis-butene-2 produced in the dehydrogenation of butenes comprising combining these feed streams and extractively distilling the combined stream in the presence of furfural containing butene-1, butenes-2 thereby producing a vaporous overhead product of butene-1 and butenes-2 and a bottoms product of furfural and butadiene and containing a minor proportion of butenes, distilling this latter bottoms product at a substantially higher temperature than that in the aforesaid extractive distilling operation into a butadiene-rich vaporous overhead product and a furfural-rich bottoms product, dividing the butadiene-rich vaporous overhead product into two portions, passing one portion at said higher temperature into the extractive distillation step as boil-up medium, and condensing the other portion as product.

4. A method for the separation and recovery of butadiene from a first feed stream comprising n-butane, cis and trans butenes-2, and a second feed stream comprising butene-1, n-butane and butadiene produced in the catalytic dehydrogenation of n-butane, and a third feed stream comprising butadiene and butene-1 with minor amounts of n-butane, cis butene-2 and trans butene-2, produced in the catalytic dehydrogenation of butenes comprising the step of extractively distilling said first feed stream in the presence of extractant furfural and a first boil-up hot vapor stream comprising butene-1, cis and trans butenes-2 subsequently produced, and thereby producing a butane-rich overhead stream and a bottoms extract comprising furfural-rich butenes, extractively distilling said second and third feed streams in the presence of said bottoms extract and a second boil-up hot vapor stream comprising butadiene with minor proportions of butenes as subsequently produced, this latter extractive distilling operation producing a first hot vaporous overhead product comprising butenes and a bottoms product comprising furfural rich in butadiene and containing a minor amount of butenes, stripping butadiene and butenes from this latter bottoms product thereby producing a second hot vaporous overhead product comprising butadiene containing a minor proportion of butenes, dividing each of said first and second hot vaporous overhead product into two portions, returning one portion of said first overhead product to the first extractive distillation step as said first boil-up material, and returning one portion of said second overhead product to the second extractive distillation step as said second boil-up material, the remaining portions of the first and second overhead products being products of the operation.

5. A method for the separation and recovery of butenes and butadiene from a first feed stream produced in the catalytic dehydrogenation of n-butane and a second feed stream produced in the catalytic dehydrogenation of butene-1 and butenes-2, said feed streams comprising n-butane, butene-1, butadiene, trans butene-2 and cis butene-2, comprising the steps of distilling said first feed stream thereby producing a first overhead product comprising butene-1 with minor amounts of butadiene and n-butane and a first bottoms product comprising n-butane with minor amounts of trans butene-2 and cis butene-2, distilling said second feed stream thereby producing a second overhead product comprising butene-1 and butadiene and a second bottoms product comprising cis and trans butenes-2, extractively distilling said first bottoms product in the presence of furfural and a first hot vaporous boil-up material subsequently produced thereby producing a third overhead product comprising n-butane and a first extract phase comprising butene-1, cis and trans butenes-2 with minor amounts of n-butane and butadiene, extractively distilling said first and second overhead products in the presence of said first extract phase and a second hot vaporous boil-up material subsequently produced thereby producing a fourth hot vaporous overhead product comprising butene-1 and cis and trans butenes-2 with minor amounts of n-butane and butadiene and a second extract phase comprising butadiene and furfural with minor amounts of butene-1 and cis and trans butenes-2, stripping said second extract phase thereby producing a fifth hot vaporous overhead product comprising butadiene containing minor amounts of butene-1 and cis and trans butenes-2 and a third bottoms product of furfural, returning this furfural as the furfural in the first mentioned extractive distilation, dividing the fourth hot vaporous overhead product into two portions, one portion being the first hot vaporous boil-up material and the other portion being a butenes product, and dividing the fifth hot vaporous overhead into two portions, one portion being the second hot vaporous boil-up material and the other portion being a butadiene product of the operation.

6. An apparatus comprising, in operable combination, first, second, third, fourth and fifth distillation columns said second and fourth columns being free of indirect reboiler means; first and second conduits communicating the overhead product outlet portions of the first and third columns, respectively, with said fourth column at its feed level; a third conduit communicating the kettle section of said first column with said second column at its feed level; fourth, fifth and sixth conduits leading from the overhead product outlet portions of said second, fourth and fifth columns, respectively; seventh, eighth and ninth conduits communicating the kettle sections of said second, fourth and fifth columns with the vapor outlet portion of said fourth column, the feed level of said fifth column and the vapor outlet portion of said second column, respectively; tenth and eleventh conduits communicating the fifth and sixth conduits with the kettle sections of said second and fourth columns, respectively to provide direct reboil for same and an outlet for water from a level above said feed level of said fifth column.

7. An apparatus comprising, in operable combination, first, second, third and fourth distillation columns; first, second, third and fourth conduits leading from the overhead product outlet portions of said first, second, third and fourth columns respectively, said first conduit communicating with said third column at its feed level and also with a source of feed stock; fifth, sixth, seventh and eighth conduits communicating the kettle sections of said first, second, third and fourth columns with the second column at its feed level, the third column at its overhead vapor outlet portion, the fourth column at its feed level, and the second column at its overhead vapor outlet portion respectively; a ninth conduit also communicating the kettle section of said fourth column with the overhead vapor outlet portion of said third column, tenth and eleventh conduits communicating said third and fourth conduits respectively, with the kettle sections of said second and third columns respectively; and an outlet for water from a level above the feed level of said fourth column.

8. In the method of claim 5, dividing said third bottoms product of furfural into two portions, returning one portion as the furfural in the first-mentioned extractive distilling and the other portion to the second extractive distilling as additional extraction solvent.

References Cited by the Examiner
UNITED STATES PATENTS

| | | | |
|---|---|---|---|
| 2,379,332 | 6/1945 | Arnold | 260—681.5 |
| 2,395,016 | 2/1946 | Schulze et al. | 260—681.5 |
| 2,619,814 | 12/1952 | Kniel | 202—75 X |
| 2,750,435 | 6/1956 | Fetchin | 202—39.5 X |
| 3,004,083 | 10/1961 | Siedenstrang et al. | 202—39.5 X |
| 3,059,037 | 10/1962 | Cahn | 202—39.5 X |

FOREIGN PATENTS 776,154  6/1957  Great Britain.

NORMAN YUDKOFF, *Primary Examiner.*
ALPHONSO D. SULLIVAN, *Examiner.*